UNITED STATES PATENT OFFICE.

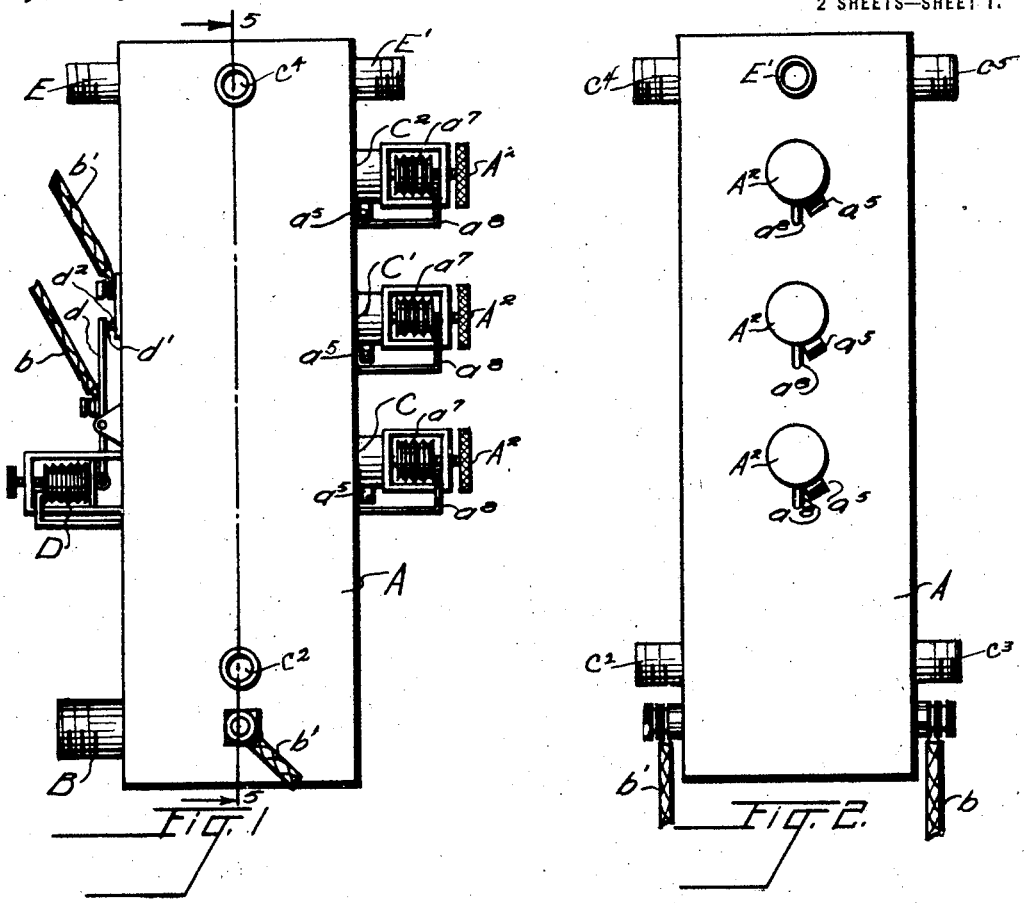
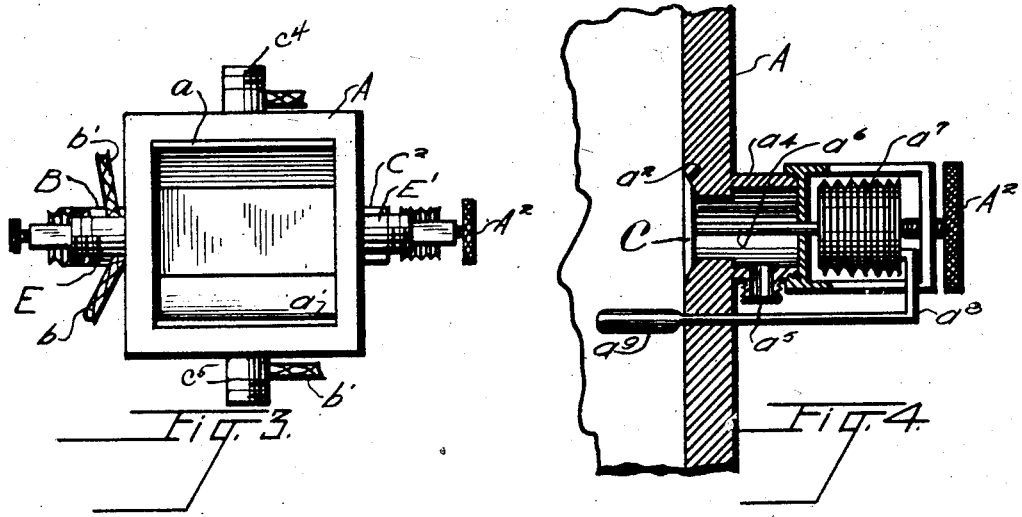

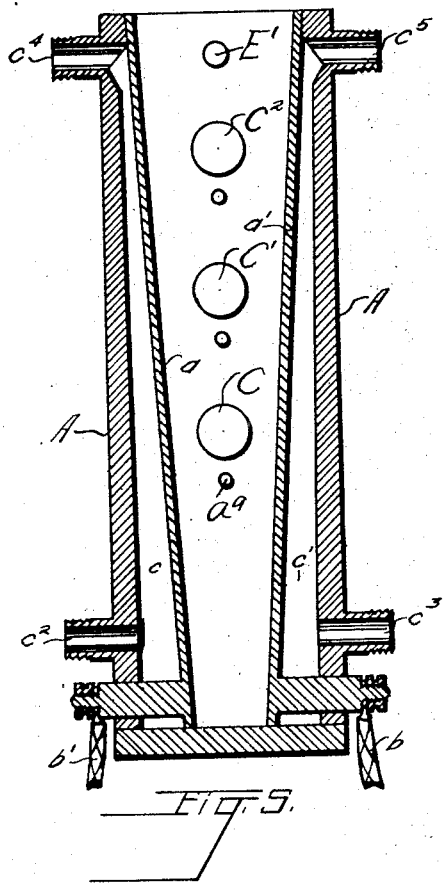

HARRY B. RUDD, OF AKRON, OHIO, ASSIGNOR TO THE ELECTROPURE DAIRY COMPANY, OF CHICAGO, ILLINOIS, A CORPORATION.

APPARATUS FOR STERILIZING LIQUIDS.

1,333,633.     Specification of Letters Patent.     Patented Mar. 16, 1920.

Application filed September 22, 1919. Serial No. 325,307.

*To all whom it may concern:*

Be it known that I, HARRY B. RUDD, a citizen of the United States, residing at Akron, Summit county, Ohio, have invented certain new and useful Improvements in Apparatus for Sterilizing Liquids, of which the following, taken in connection with the drawings, is a description.

My invention has for its object the production of an improved apparatus for sterilizing liquids of all kinds, being particularly desirable for use in sterilizing milk and the like, whereby any bacteria therein are rendered inactive and the milk or other liquid may be kept in an unchanged condition for an indefinite length of time.

It is also an object of my invention to treat the liquid while in transit through a receptacle in which the temperature is raised to a point at which any organic life will be destroyed but to discharge said liquid before it becomes super-heated or burned.

A further object of my invention is to provide an automatically operated discharge valve, whereby the temperature of the liquid will automatically cause the opening of a valve when the liquid is heated to the temperature desired.

The invention further consists in the details of construction and in the combined arrangement of the several parts of my improved apparatus wherein certain important advantages are attained and the device rendered simpler and less expensive, as well as more convenient and advantageous for the use and purposes for which it is intended, as will be hereinafter more fully set forth.

In the accompanying drawings, I have illustrated what I now consider the preferred form of an embodiment of my invention, and in these drawings, Figure 1, is a side elevation of my invention, Fig. 2, is a front elevation of the same;

Fig. 3, is a top plan view;

Fig. 4, is an enlarged, sectional detail of one of the thermodynamic discharge valves and, Fig. 5, is a transverse vertical section through the apparatus.

Referring to the drawings, A represents the wall of a shell or casing of a preferably, upright receptacle, formed of any suitable material which in this instance, I have shown to be practically square in cross section, but it may be of any size or shape desired and found suitable for the purpose.

Arranged preferably upon two opposite sides of the inner wall of this receptacle A, are electrodes $a$—$a'$ formed of a special non-corrosive material, which will not be here described as it will form a separate application. These electrodes are angularly disposed inside the receptacle inclining from the top to the bottom of the receptacle, providing a trough like receptacle to receive the liquid to be treated, and forming chambers $c$, $c'$ between said electrodes and the outer wall A.

Connecting with the electrodes $a$—$a'$ are the terminals $b$—$b'$, which in turn extend to a suitable source of electrical energy.

B is a port or opening communicating with the interior of the receptacle A, having connection at its opposite end with a receptacle (not here shown), containing the liquid to be treated which is introduced into the receptacle, preferably by siphonic action, although any other means of supplying the liquid to the receptacle A may be used.

Positioned upon one side of the receptacle A are the thermostatically controlled discharge valves C, C', $C^2$. In Fig. 4, I have illustrated in sectional detail a form of construction of said valves, C, C', $C^2$, which I have found practical and suitable for this purpose. In this construction $a^2$ is a valve seat provided in the wall of the casing in which is seated the valve C. The casing $a^4$ is provided with a discharge opening $a^5$ through which the liquid to be treated passes to a receptacle (not here shown.)

A valve rod $a^6$ extends from the valve C through the casing $a^4$ to the wall of an expansion chamber $a^7$, positioned in the housing A'. $A^2$ is a thumb screw regulating the limit of the expansive movement in the casing of the chamber $a^7$. Extending from this casing $a^7$ to the interior of the receptacle A is a tubular member $a^8$ carrying on the end thereof a bulb $a^9$, which contains fluid, such as ether, or any other liquid, the expansive force of which when heated, will cause the pressure in the chamber formed in casing $a^7$ to exert sufficient force against the valve C to unseat said valve and allow the liquid to discharge therethrough.

Any liquid to be treated is introduced into the receptacle A through the tube B near the bottom of said receptacle, the source of supply being located at a level higher than the receptacle A. In seeking its level, the liquid to be treated will travel upwardly in the receptacle A, current passing into and through said liquid from the wires b—b' and electrodes a—a', heating the liquid therein to any temperature desired for the purpose heretofore specified. For practical use I have found that 165 degrees Fahr. produces the results desired.

The action of the thermostat may be so regulated by the screw $A^2$ that when the liquid reaches the temperature required, which will be indicated by the bulb $a^6$, the heat causing the fluid or gases therein to expand into the chamber formed in the casing $a^7$, causes said casing to press against the valve C until it is moved out of its seat and allows the liquid therein to be discharged through the opening $a^5$ and be transferred to any place desired.

If the current of electricity passing through the liquid being treated has not raised its temperature to the degree desired by the time it has reached the height of the first valve C of the receptacle, the liquid will continue to rise in the receptacle A until it reaches the second bulb C' when the thermostat will open the same by the operation heretofore explained in connection with the first valve, and the liquid may be discharged in the same manner. Likewise in the operation of the third valve, C' the highest one in the series herein arranged in the receptacle shown in the drawings.

In the event the electric current was not flowing and the liquid was entering the receptacle A through pipe B, it would fill said receptacle and discharge through overflow pipes E—E' and carried back to the supply tank (not here shown.)

In Fig. 1, I have illustrated a thermodynamic control of the electric current by means of which the current may be automatically shut off if for any reason the flow of liquid has ceased and the liquid remaining in the receptacle is becoming over heated. In this instance, D represents a thermostat of the same kind heretofore explained, and which supports a rod carrying a contact point d' which normally closes the circuit with the contact $d^2$. This contact controls the flow of current on the wires b—b'.

A water jacket is provided between the electrodes a—a' and the walls of the receptacle A as shown more clearly in Fig. 5. $c^2$—$c^3$ are ports provided near the bottom of the receptacle through which water is introduced into the chambers c—c' and allowed to fill the same to the top of the receptacle where ports $c^4$ $c^5$ permit it to be discharged. These water jackets keep the electrodes a—a' cool at all times.

I claim:

1. In apparatus for sterilizing liquids, a receptacle, electrodes arranged inside thereof and having connection with a source of electrical energy, and automatically operating valves for discharging the liquid at certain predetermined temperatures.

2. In apparatus for sterilizing liquids, a receptacle, electrodes arranged therein and having connection with a source of electrical energy, discharge valves, and a thermostat connected with each valve whereby it is automatically operated at a predetermined temperature.

3. In apparatus for sterilizing liquids, an upright receptacle having an intake port near the bottom thereof, electrodes arranged inside of said receptacle and having connection with a suitable source of electrical energy and a thermodynamic valve in said receptacle, operable at a predetermined temperature to permit the discharge of the liquid therefrom.

4. In apparatus for sterilizing liquids, an upright receptacle having an intake port near the bottom thereof, electrodes arranged inside of said receptacle and having connection with a suitable source of electrical energy, a plurality of thermodynamic valves, arranged at different heights in said receptacle and operable at a predetermined temperature to permit the discharge of the liquid therefrom.

5. In apparatus for sterilizing liquids, a receptacle having an intake port near the bottom thereof, vertically extending electrodes arranged in said receptacle and having connection with a suitable source of electrical energy, thermodynamic valves arranged at different heights in said receptacle for controlling the discharge of the liquid therefrom.

6. In apparatus for sterilizing liquids, an upright receptacle having an intake port near the bottom thereof, vertically extending electrodes suitably arranged in said receptacle and connected with a source of electrical energy, a plurality of thermodynamic valves in said receptacle, operating to automatically discharge the liquid from said receptacle at a predetermined temperature, and a thermodynamic control mechanism, automatically disconnecting the electric circuit, substantially as described.

7. In apparatus for sterilizing liquids, an upright receptacle, electrodes on two sides of said receptacle arranged to extend at an angle inclining toward the center of the receptacle at the bottom thereof, terminals connecting said electrodes with a suitable source of electrical energy, thermodynamic valves arranged in said receptacle, and operable to discharge the liquid being treated at a predetermined temperature.

8. In apparatus for sterilizing liquids, an upright receptacle, electrodes on two sides of said receptacle arranged to extend at an angle inclining toward the center of the receptacle at the bottom thereof, terminals connecting said electrodes with a suitable source of electrical energy, thermodynamic valves arranged in said receptacle, and operable to discharge the liquid being treated at a predetermined temperature, and thermodynamic mechanism controlling the flow of current through the liquid being treated.

9. In apparatus for sterilizing liquids, an upright receptacle, electrodes arranged on two sides of said receptacle to extend at angles inclining toward the center of the receptacle at the bottom thereof, and forming chambers between the electrodes and the wall of the receptacle, terminals connected with said electrodes with a suitable source of electrical energy, and automatically regulated valves controlling the discharge of the liquid from the receptacle.

10. In apparatus for sterilizing liquids, an upright receptacle, having electrodes arranged on two sides of said receptacle, extending at an angle from the top to the bottom of the receptacle, and forming water jacket chambers between the electrodes and the wall of the receptacle, an intake pipe and a discharge pipe having communication with each of said chambers, wires connecting said electrodes with a source of electrical energy, and thermodynamic valves operable at predetermined temperatures, permitting the discharge of the liquid from the receptacle.

In testimony whereof I have signed this specification.

HARRY B. RUDD.